United States Patent [19]

Crawley et al.

[11] 4,131,571

[45] Dec. 26, 1978

[54] POLYURETHANE METALLIC ENAMEL

[75] Inventors: Keenan L. Crawley, Hope, Ark.;
Lester I. Miller, Troy, Mich.

[73] Assignee: E. I. Du Pont de Nemours and Company, Wilmington, Del.

[21] Appl. No.: 844,107

[22] Filed: Oct. 19, 1977

Related U.S. Application Data

[63] Continuation-in-part of Ser. No. 645,216, Dec. 29, 1975, abandoned.

[51] Int. Cl.$^2$ .............................................. C08L 1/14
[52] U.S. Cl. ........................................ 260/17 R; 260/13;
428/332; 428/344; 428/423; 428/464
[58] Field of Search ...................................... 260/17 R

[56] References Cited

U.S. PATENT DOCUMENTS

| | | | |
|---|---|---|---|
| 3,271,352 | 9/1966 | Weinberg | 260/37 N |
| 3,558,564 | 1/1971 | Vasta | 260/29.1 |
| 3,622,651 | 11/1971 | Vasta | 260/856 |
| 3,637,546 | 1/1972 | Parker | 260/15 |
| 3,657,001 | 4/1972 | Parker | 260/15 |
| 3,790,513 | 2/1974 | Victorius | 260/15 |
| 3,844,993 | 10/1974 | Miller | 260/22 TN |
| 3,846,368 | 11/1974 | Pettit | 260/15 |
| 3,939,114 | 2/1976 | Camelon | 260/836 |

OTHER PUBLICATIONS

Chem. Absts., vol. 68: 70214a, "Clear Coatings," Rothstein.

*Primary Examiner*—Edward M. Woodberry

[57] ABSTRACT

A coating composition containing
  (1) an acrylic polymer having pendent hydroxyl containing ester groups;
  (2) cellulose acetate buryrate,
  (3) an alkyl acid phosphate,
  (4) a metallic flake pigment such as aluminum flake and, optionally other pigments,
  (5) an ultraviolet light absorbing agent
  (6) an organo metal catalyst, and
  (7) an organic polyisocyanate;

the composition forms an excellent finish for the exterior of automobiles and trucks since the finish is glossy, durable and weatherable and has excellent metallic glamour.

9 Claims, No Drawings

POLYURETHANE METALLIC ENAMEL

CROSS REFERENCE TO RELATED APPLICATIONS

This application is a continuation-in-part application of Serial No. 645,216, filed Dec. 29, 1975 now abandoned.

BACKGROUND OF THE INVENTION

This invention is directed to a new coating composition and in particular to a new coating composition that forms a finish having an excellent appearance.

Acrylic lacquer and enamel coating compositions are well known and have been widely used to finish automobiles and trucks and also have been used to refinish and repair finishes on automobiles and trucks. One particular high quality acrylic polyurethane coating composition described in Vasta U.S. 3,558,564 issued Jan. 26, 1971 has been widely used for finishing, refinishing and repairing automobiles and trucks. However, this composition presently contains only solid colors pigments and not metallic flake pigments, such as aluminum flake pigments that provide metallic glamour to the resulting finish. When metallic flake pigments are incorporated into the above acrylic polyurethane coating composition, mottled finishes result having a low gloss and generally a poor appearance. There is a need for an acrylic polyurethane coating composition in which metallic flake pigments can be used and which gives a rapid curing high gloss non-mottling finish.

SUMMARY OF THE INVENTION

The coating composition of this invention has a solids content of 5–60% by weight and contains 95–40% by weight of an organic liquid; the solids consist essentially of (1) 50–95% by weight of an acrylic polymer having a backbone of polymerized acrylic esters of the group of alkyl methacrylate, alkyl acrylate or mixtures thereof, each having 1–12 carbon atoms in the alkyl groups and having polymerized ethylenically unsaturated ester units that form ester groups pending from the carbon atoms of the backbone that comprise about 10 to 75% of the total weight of the polymer and are of ester group (A)

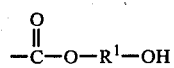

and ester group (B) which is either

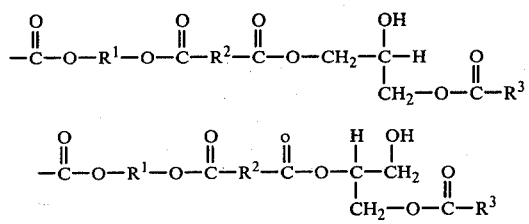

or a mixture of these groups; wherein the molar ratio of ester group (A) to ester group (B) is from about 1:1.5 to 1:2.5; and wherein $R^1$ is a saturated hydrocarbon radical having 2–4 carbon atoms $R_2$ is an aromatic radical, $R_3$ is a tertiary hydrocarbon group having 8–10 carbon atoms;

(2) 1–15% by weight of cellulose acetate butyrate having a butyryl content of about 50–60% by weight, a hydroxyl content of about 1.0–3.0% by weight and a viscosity of 0.02–0.5 seconds measured at 25° C. according to ASTM D-1343-56;

(3) 0.05–1.0% by weight of an alkyl acid phosphate having 1–12 carbon atoms in the alkyl group;

(4) 0.2–20.0% by weight of metallic flake pigment;

(5) 0.01–5.0% by weight of an ultraviolet light absorbing agent;

(6) 0.01–0.10% by weight of an organo metal catalyst; and (7) 3.73–48.73% by weight of an organic polyisocyanate.

DESCRIPTION OF THE INVENTION

The coating composition of this invention contains metallic flake pigments and forms an acrylic polyurethane finish having excellent gloss, a good appearance and is not mottled. The composition has good shelf stability but cures rapidly after application.

The composition contains about 5–60% by weight of solids and about 95–40% by weight of an organic liquid. The solids of the composition are of about 50–95% by weight of an acrylic polymer, 1–15% by weight of cellulose acetate butyrate, 0.05–1.0% by weight of an alkyl acid phosphate, 0.2–20.0% by weight of a metallic flake pigment, 0.01–5.0% by weight of an ultraviolet light absorbing agent, 0.01–0.10% by weight of an organo metal catalyst, and 3.73–48.73% by weight of an organic polyisocyanate. In addition, the composition can contain 1–50% by weight of other pigments, plasticizers and other conventional additives.

The acrylic polymer and the preparation thereof is disclosed in aforementioned Vasta patent which is hereby incorporated by reference into this application. Styrene can be used in the backbone in addition to the alkyl acrylate and methacrylate constituents. One particularly useful acrylic polymer which forms a high quality finish is an acrylic polymer of styrene/methyl methacrylate/hydroxy ethyl acrylate/phthalic anhydride/a mixed glycidyl ester of synthetic tertiary carboxylic acids of the formula

where $R^3$ is a tertiary aliphatic hydrocarbon of 8–10 carbon atoms; wherein the acrylic polymer has the aforementioned pendent ester groups (A) and (B) in the above molar ratio.

Any of the polyisocyanates disclosed in the above Vasta patent are useful in the composition. Generally, for exterior durability aliphatic polyisocyanates or cycloaliphatic polyisocyanates are preferred. One particularly useful polyisocyanate is the biuret of an alkylene diisocyanate having 1–6 carbon atoms in the alkylene group. One preferred polyisocyanate is the biuret of hexa(methylene)diisocyanate.

The cellulose acetate butyrate used in the composition has a butyryl content of about 50–60% by weight, a hydroxyl content of 1.0–3.0% by weight and has a viscosity of about 0.02–0.5 seconds measured at 25° C. according to ASTM D-1343-56. One preferred cellulose acetate butyrate that forms a high glamour finish has a butyryl content of 53-55% by weight and a viscosity of about 0.1-0.5 seconds and a hydroxyl content of 1.5-2.5% by weight.

The alkyl acid phosphate used in the composition has 1-12 carbon atoms in the alkyl group; preferably, the alkyl group has 2-6 carbon atoms. In prior art coating compositions the alkyl acid phosphate is used to reduce yellowing of a finish after application but in the present invention the alkyl acid phosphate is used to improve gloss of a resulting finish. Butyl acid phosphate is one preferred compound that provides a proper curing composition. One technique for preparing this preferred phosphate is to react phosphorus pentoxide with butanol giving a product that has an acid number of about 100-150. Other alkyl acid phosphates that are used are mono dialkyl acid phosphates or mixtures thereof and have an acid number of about 4-250; typical examples of these are:

methyl acid phosphate
ethyl acid phosphate
propyl acid phosphate
isopropyl acid phosphate
pentyl acid phosphate
hexyl acid phosphate
2-ethylhexyl acid phosphate
octyl acid phosphate
nonyl acid phosphate
decyl acid phosphate and
lauryl acid phosphate.

The metallic flake pigments used in the composition are any of those pigments that provide a finish with metallic glamour. These pigments include any of the conventional metallic flake pigments, such as aluminum flake, nickel flake, nickel-chrome flake, but also includes "Fire Frost" flake which is a polyester flake coated with a layer of vapor-deposited aluminum and "Afflair" pigments which are mica flakes coated with titanium dioxide. Generally, aluminum flake pigment is used. These flake pigments previously could not be used in the high quality coating compositions disclosed in the above Vasta patent without resulting in a poor appearance of the finish caused by low gloss and mottling of the finish. In the coating compositions of this invention, flake pigments are used and the resulting finishes have a good gloss and an excellent appearance.

The coating composition generally contains other conventional pigments such as metallic oxides, preferably titanium dioxide, zinc oxide, iron oxide, and the like, metallic powders, metallic hydroxides, phthalocyanine pigments such as copper phthalocyanine blue or green, quinacridones, sulfates, carbonates, carbon blacks, silica, and other pigments, organic dyes, lakes, and the like.

The coating composition contains ultraviolet light absorbing agents. Substituted benzotriazoles and benzophenones are typically useful ultraviolet light absorbing agents.

Typically useful substituted benzophenones have the structural formula

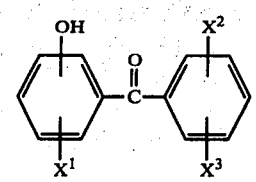

where $X^1$, $X^2$ and $X^3$ are individually selected from the group of hydrogen, hydroxyl, alkyl, alkoxy and halogen. One particularly useful benzophenone is 4-dodecyloxy-2-hydroxy benzophenone.

Typical substituted benzotriazoles have the general formula

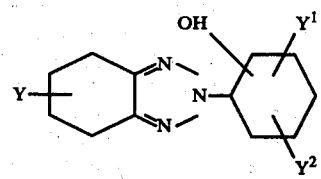

where Y, $Y^1$, and $Y^2$ are individually selected from the group of hydrogen, hydroxyl, alkyl, and a halogen. One useful substituted benzotriazole is 2-(2'-hydroxy-5'-methyl phenyl) benzotriazole. Others are disclosed in U.S. 3,640,928, U.S. 3,004,896, and U.S. 3,189,615.

Typical organo metal catalysts used in the composition are stannous dioctoate and alkyl metal laurates, such as alkyl tin laurate, alkyl cobalt laurate, alkyl manganese laurate, alkyl zirconium laurate, alkyl nickel laurate. The alkyl group can have from 1-12 carbon atoms. Particularly useful catalysts are dibutyl tin dilaurate and stannous dioctoate.

Any of the conventional solvents can be used in the composition, such as toluene, xylene, butyl acetate, acetone, methyl isobutyl ketone, methyl ethyl ketone, and other aliphatic, cycloaliphatic and aromatic hydrocarbons, esters, ethers, ketones, and the like. These solvents also can be used to reduce the composition to an application viscosity.

The coating composition is applied by conventional techniques such as brushing, spraying, dipping, flow coating and the like, and either dried at ambient temperatures or at elevated temperatures of 50-100° C. for 2-30 minutes. The resulting acrylic coating layer is about 0.1-5 mils thick. Usually about a 1-3 mil thick layer is applied.

The composition can be applied over a wide variety of substrates such as metal, wood, glass, plastics, primed metals, or previous coated or painted metals. If used to repair an existing finish, the composition is usually applied over an acrylic primer surfacer. The composition can be applied directly to an acrylic lacquer or enamel finish that has been sanded and cleaned with an aliphatic hydrocarbon solvent. The composition can be applied as an original finish over an epoxy primer or other conventional primers or can be applied directly to bare metal. It is preferred to have the metal surface treated with a phosphate.

The following Examples illustrate the invention. The parts and percentages are by weight unless otherwise specified.

EXAMPLE 1

A coating composition is prepared as follows:

|  | Parts by Weight |
|---|---|
| Portion 1 | |
| Acrylic resin solution (55% solids in a solvent blend of 89% ethylene glycol monoethyl ether acetate, 11% VM and P naphtha of an acrylic polymer of styrene/methyl methacrylate/hydroxyethyl acrylate/"Cardura" E ester[1]/ phthalic anhydride in a weight ratio of 30/15/17/25/13 prepared according to Example 1 of U.S. Pat. No. 3,558,564) | 356.15 |
| Cellulose Acetate Butyrate Solution (30% solids in a solvent mixture of ethylene glycol monoethyl ether acetate ethyl acetate in a 1:7 ratio of cellulose acetate butyrate having a butyryl content of 55% and a viscosity of 0.2 seconds measured at 25° C. according to ASTM D-1343-56 and a hydroxyl content of about 1.5-2.5% by weight.) | 37.01 |
| Aluminum Flake Dispersion (52% solids in a solvent blend of ethylene glycol monoethyl ether acetate/VM and P Naphtha/mineral spirits in a 77.8/10.1/12.1 ratio and aluminum flake pigment and a binder of the above acrylic resin in a pigment to binder ratio of 21.2/100) | 164.86 |
| Portion 2 | |
| Dibutyl tin dilaurate solution (0.2% solids in ethyl acetate) | 41.91 |
| U.V. Screener Solution (10%, solids in ethyl acetate of "Tinuvin" 328 U.V. absorber[2]) | 55.12 |
| Butyl Acid Phosphate Solution (30% solids in xylene of the reaction product of phosphorous pentoxide and butanol having an acid number of 118-143) | 2.50 |
| Ethylene glycol monobutyl ether acetate | 10.90 |
| Ethyl acetate | 77.30 |
| Portion 3 | |
| VM and P naphtha | 65.52 |
| Total | 811.27 |

[1]"Cardura" E ester (a mixed ester described in U.S. Pat. No. 3,275,583, issued Sept. 27, 1966, and is a glycidyl ester of a synthetic tertiary carboxylic acid of the formula

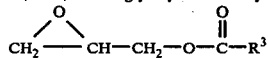

where $R^3$ is a tertiary aliphatic hydrocarbon group of 8-10 carbon atoms).
[2]"Tinuvin" 328 U.V. absorber-benzotriazole of the formula

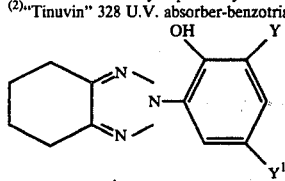

where Y and $Y^1$ are alkyl.

Portion 1 is charged into a mixing vessel thoroughly mixed. Portion 2 is added and mixed with portion 1 for about 1 hour. Portion 3 is added and mixed for 30 minutes.

An isocyanate solution is prepared by blending together the following constituents:

|  | Parts by Weight |
|---|---|
| Ethyl acetate | 451.17 |
| Solution of the biuret of hexamethylene diisocyanate (75% solids in ethylene glycol monoethyl ether acetate/xylene) | 350.83 |
| Total | 802.00 |

A sprayable coating composition is prepared by thoroughly blending 3 parts by volume of the above prepared coating composition with 1 part by volume of the isocyanate solution. The resulting composition is sprayed onto each of the following substrates:

a phosphatized steel substrate,
a steel substrate coated with an alkyd resin primer,
a steel substrate coated with an epoxy primer,
a primed steel substrate coated with an acrylic lacquer, and
a primed steel substrate coated with an acrylic enamel.

In each case the finish was dried at room temperature to provide a finish about 2-3 mils in thickness. In each case the finish has good adhesion to the substrate, good gloss and excellent metallic appearance and good chemical and water spot resistance.

EXAMPLE 2

A coating composition is prepared as follows:

|  | Parts by Weight |
|---|---|
| Portion 1 | |
| Ethylene glycol monobutyl ether acetate | 13.21 |
| Acrylic resin solution (described in Example 1) | 157.39 |
| Cellulose Acetate Butyrate solution (described in Example 1) | 37.00 |
| Aluminum Flake Paste (70% solids aluminum flake pigment in mineral spirits) | 23.08 |
| Portion 2 | |
| Acrylic resin solution (described in Example 1) | 372.42 |
| Dibutyl tin dilaurate solution (described in Example 1) | 41.90 |
| U.V. Screener Solution (described in Example 1) | 55.10 |
| Butyl Acid Phosphate solution (described in Example 1) | 2.50 |
| Portion 3 | |
| Ethylene glycol monobutyl ether acetate | 10.90 |
| Ethyl acetate | 77.00 |
| VM and P Naphtha | 65.50 |
| Total | 856.00 |

Portion 1 is charged into a mixing vessel thoroughly mixed for 2 hours. Portion 2 is added and mixed with portion 1 for about 1 hour. Portion 3 is slowly added and mixed for 30 minutes.

A sprayable coating composition is prepared by thoroughly blending 3 parts by volume of the above prepared coating composition with 1 part by volume of the isocyanate solution prepared in Example 1. The resulting composition is sprayed onto each of the following substrates:

a phosphatized steel substrate,
a steel substrate coated with an alkyd resin primer,
a steel substrate coated with an epoxy primer,
a primed steel substrate coated with an acrylic lacquer, and
a primed steel substrate coated with an acrylic enamel.

In each case the finish was dried at room temperature to provide a finish about 2-3 mils in thickness. In each case the finish has good adhesion to the substrate, good gloss and excellent metallic appearance and good chemical and water spot resistance.

The claims are:

1. A coating composition having a solids content of 5-60% by weight in an organic liquid; wherein the solids consist essentially of
   (1) 50-95% by weight of an acrylic polymer having a backbone consisting essentially of polymerized monomers of the group of methyl methacrylate, styrene or mixtures thereof and polymerized ethylenically unsaturated ester monomers that form ester groups pending from the carbon atoms of the polymer backbone and comprise about 10 to 75% of the total weight of the polymer and consisting essentially of ester group (A)

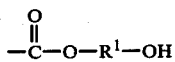

and ester group (B) selected from the group consisting of

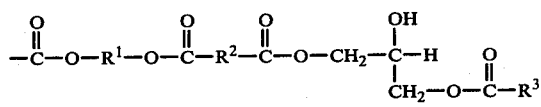

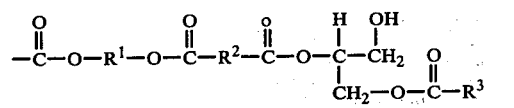

or mixtures thereof, wherein the molar ratio of ester group (A) to ester (B) is from about 1:1.5 to 1:2.5; and wherein
   $R^1$ is a saturated hydrocarbon group having 2-4 carbon atoms,
   $R^2$ is phenylene,
   $R^3$ is a tertiary hydrocarbon group having 8 through 10 carbon atoms;
   (2) 1-15% by weight of cellulose acetate butyrate having a butyryl content of about 50-60% by weight, a hydroxyl content of about 1.0-3.0% by weight, and a viscosity of 0.02-0.5 seconds measured at 25° C. according to ASTM D-1343-56;
   (3) 0.05-1.0% by weight of an alkyl acid phosphate having 1-12 carbon atoms in the alkyl group;
   (4) 0.2-20% by weight of aluminum flake pigment;
   (5) 0.01-5% by weight of an ultraviolet light absorbing agent from the group of a substituted benzotriazole, a substituted benzophenone or a mixture thereof;
   (6) 0.01-0.10% by weight of an alkyl tin laurate catalyst; and
   (7) 3.73-48.73% by weight of a polyisocyanate of the biuret of an alkylene diisocyanate having 1-6 carbon atoms in the alkylene group.

2. The coating composition of claim 1 containing in addition 1-50% by weight, based on the weight of the coating composition, of pigment.

3. The coating composition of claim 2 in which the alkyl acid phosphate is butyl acid phosphate.

4. The coating composition of claim 3 in which $R^1$ is $(CH_2)_2$.

5. The coating composition of claim 4 in which the cellulose acetate butyrate has a butyryl content of 53-55% by weight, a hydroxyl content of 1.5-2.5% by weight, and a viscosity of 0.1-0.5 second.

6. The coating composition of claim 5 in which the ultraviolet light absorbing agent is a substituted benzotriazole.

7. The coating composition of claim 6 in which the alkyl tin laurate is dibutyl tin dilaurate.

8. The coating composition of claim 7 in which the polyisocyanate is the biuret of hexamethylene diisocyanate.

9. The coating composition of claim 1 containing in addition about 1-50% by weight pigment, and wherein
   (1) the acrylic polymer has a backbone of styrene and methyl methacrylate and ester group A is from hydroxy ethyl acrylate and ester group B is from hydroxy ethyl acrylate, phthalic anhydride and a mixed glycidyl ester of a tertiary carboxylic acid and wherein $R^1$ is $(CH_2)_2$ and $R^2$ is phenylene;
   (2) the cellulose acetate butyrate has a butyryl content of 53-55% by weight, a hydroxyl content of 1.5-2.5% by weight, and a viscosity of about 0.1-0.5 second;
   (3) the alkyl acid phosphate is butyl acid phosphate;
   (4) the ultraviolet light absorbing agent is a substituted benzotriazole of the formula

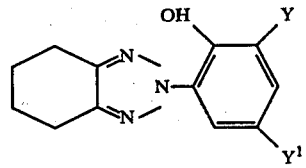

where Y and $Y^1$ are alkyl groups;
   (5) the alkyl tin laurate catalyst is dibutyl tin dilaurate; and
   (6) the polyisocyanate is the biuret of hexamethylene diisocyanate.

* * * * *